(12) United States Patent
Kim et al.

(10) Patent No.: US 9,910,291 B2
(45) Date of Patent: Mar. 6, 2018

(54) CAMERA LENS MODULE HAVING AUTO-FOCUSING AND OPTICAL IMAGE STABILIZING FUNCTIONS

(71) Applicant: JAHWA electronics Co., Ltd., chungcheongbuk-do (KR)

(72) Inventors: Hee Seung Kim, Seoul (KR); In Soo Kim, Seoul (KR); Il Gyu Kang, Cheongju-si (KR)

(73) Assignee: JAHWA electronics Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 15/420,526

(22) Filed: Jan. 31, 2017

(65) Prior Publication Data

US 2017/0139227 A1 May 18, 2017

Related U.S. Application Data

(62) Division of application No. 14/772,181, filed as application No. PCT/KR2014/002686 on Mar. 28, 2014, now Pat. No. 9,784,988.

(30) Foreign Application Priority Data

Mar. 29, 2013 (KR) .................. 10-2013-0034730
Jul. 17, 2013 (KR) .................. 10-2013-0083951

(51) Int. Cl.
| | | |
|---|---|---|
| G02B 27/64 | (2006.01) |
| G03B 3/10 | (2006.01) |
| G03B 17/02 | (2006.01) |
| G03B 5/02 | (2006.01) |
| G02B 7/09 | (2006.01) |
| G02B 13/00 | (2006.01) |
| H04M 1/02 | (2006.01) |

(52) U.S. Cl.
CPC ............ *G02B 27/646* (2013.01); *G02B 7/09* (2013.01); *G02B 13/001* (2013.01); *G03B 3/10* (2013.01); *G03B 5/02* (2013.01); *G03B 17/02* (2013.01); *H04M 1/0264* (2013.01); *G03B 2205/0015* (2013.01)

(58) Field of Classification Search
CPC ........ G02B 7/04; G02B 27/64; G02B 27/646; H04N 5/23248; H04N 5/23264; H04N 5/2328; H04N 5/23287
USPC ......... 359/554, 557; 250/201.1, 201.2, 201.4
See application file for complete search history.

(56) References Cited

U.S. PATENT DOCUMENTS

| | | | |
|---|---|---|---|
| 9,319,574 B2* | 4/2016 | Shin ................ | H04N 5/2254 |
| 9,784,988 B2* | 10/2017 | Kim ................ | G02B 27/646 |
| 2014/0255016 A1* | 9/2014 | Kim ................ | G02B 27/646 |
| | | | 396/55 |

(Continued)

*Primary Examiner* — Arnel C Lavarias
(74) *Attorney, Agent, or Firm* — Maier & Maier, PLLC

(57) ABSTRACT

A camera lens module of a portable terminal includes an external case; an OIS carrier disposed in the external case; a lens system which is guided along an optical axis in the OIS carrier; an AF driving unit facing to a first surface of the external case and which enables the lens system to move; a first OIS driving unit disposed in parallel along a second surface of the external case at the other side opposite to the first surface on which the AF driving unit is disposed; and a second OIS driving unit disposed in parallel along a third surface of the external case between the first OIS driving unit and the AF driving unit.

15 Claims, 7 Drawing Sheets

(56) References Cited

U.S. PATENT DOCUMENTS

2014/0362284 A1\* 12/2014 Shin .................... H04N 5/2254
  348/373

\* cited by examiner

[Fig. 1]
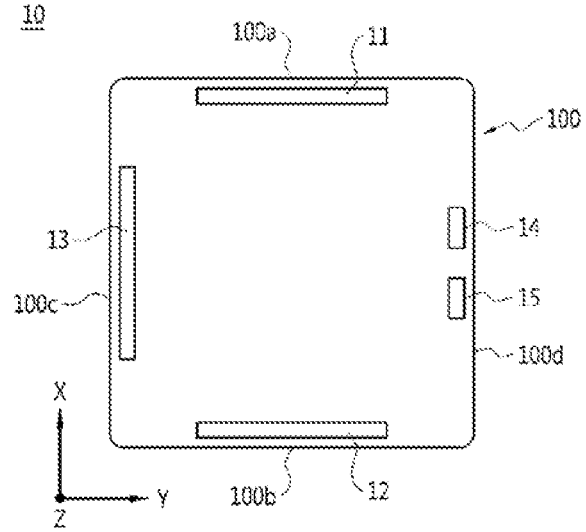
[Fig. 2a]
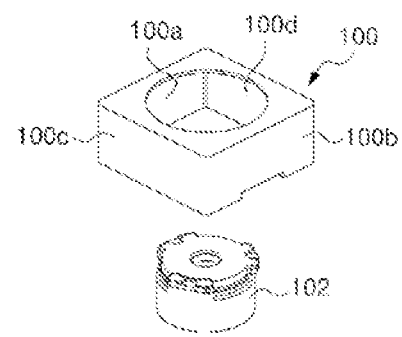
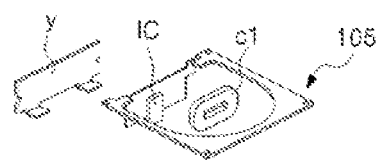
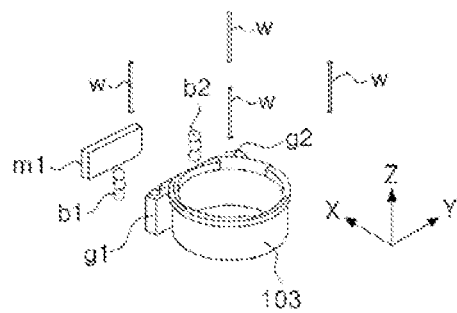

[Fig. 2b]
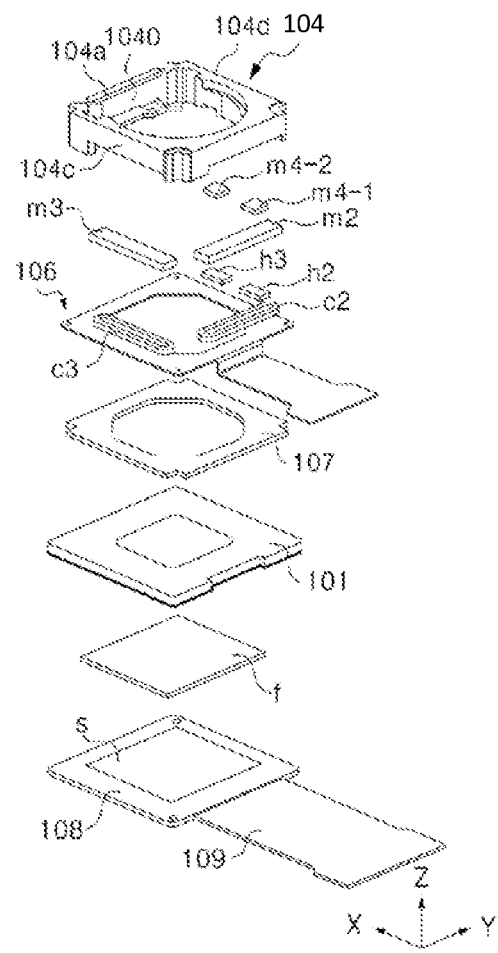
[Fig. 3]
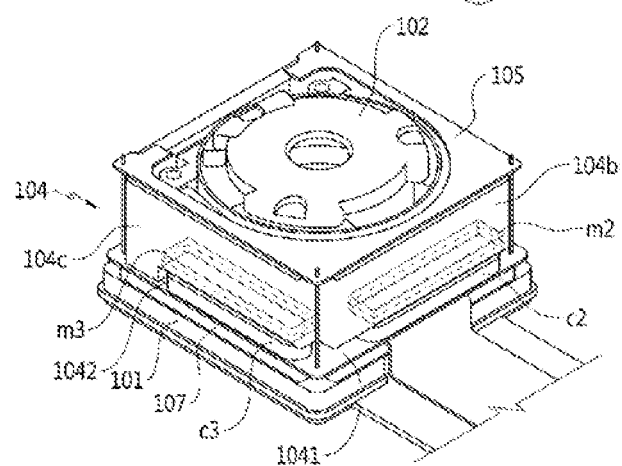

[Fig. 4]
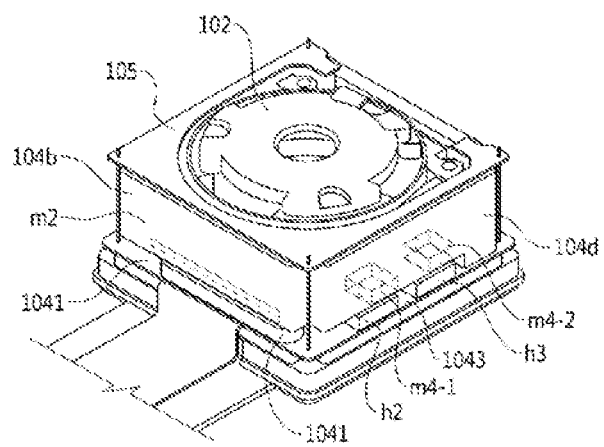
[Fig. 5]
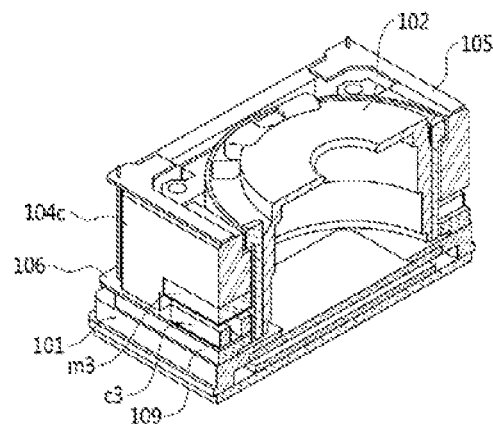
[Fig. 6]
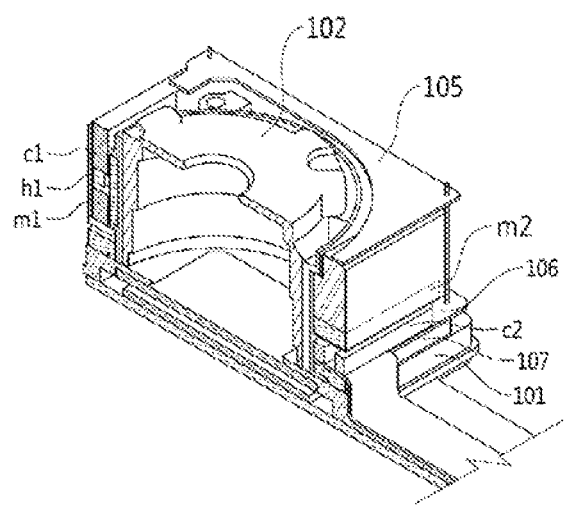

[Fig. 7]
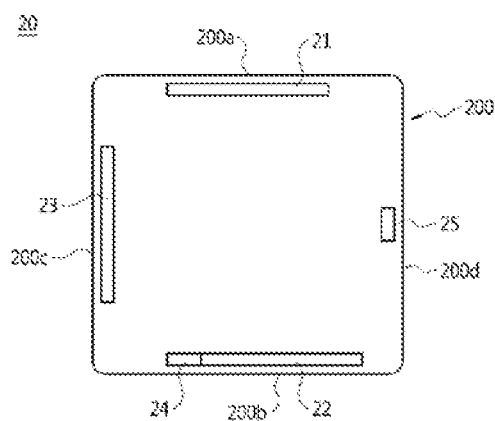
[Fig. 8]
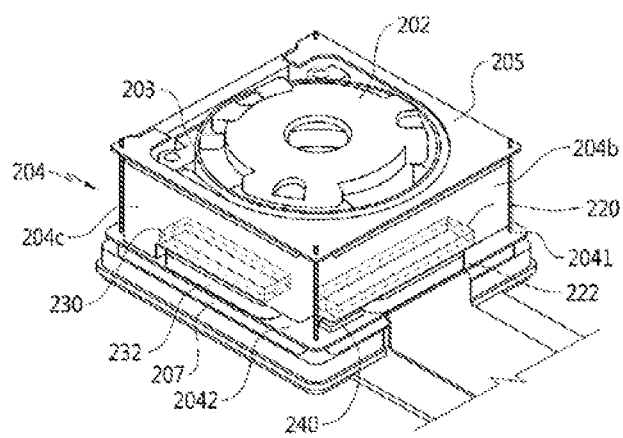
[Fig. 9]
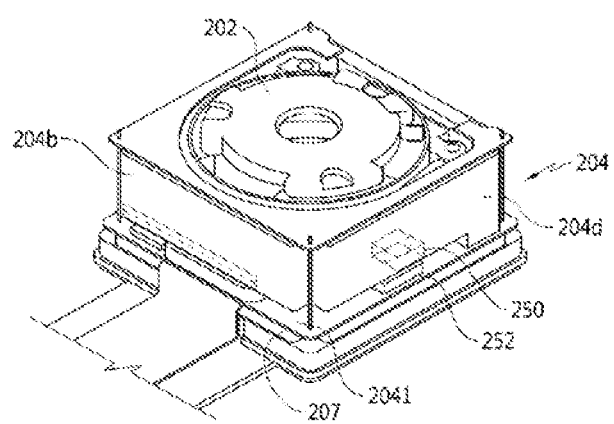

[Fig. 10]
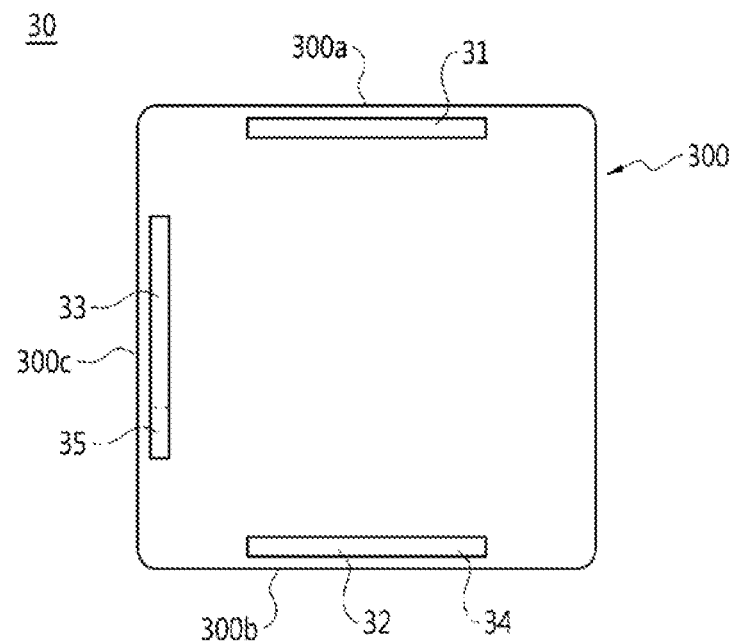
[Fig. 11]
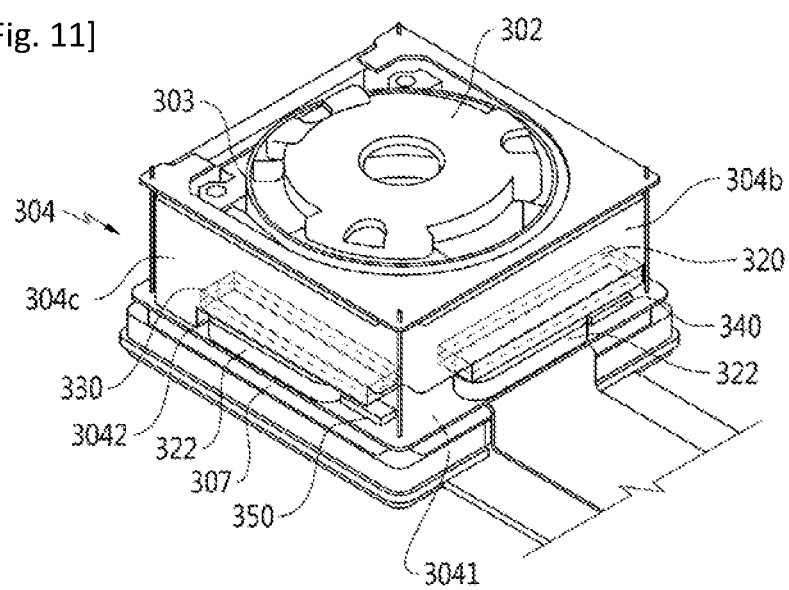

[Fig. 12]
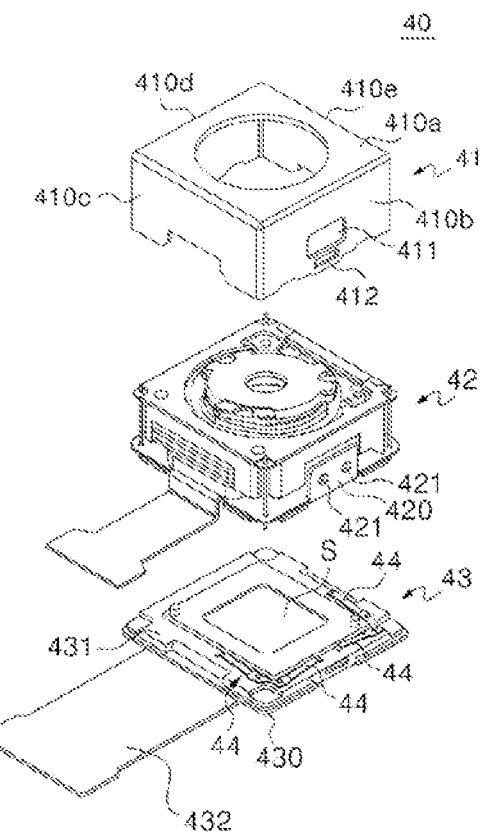
[Fig. 13]
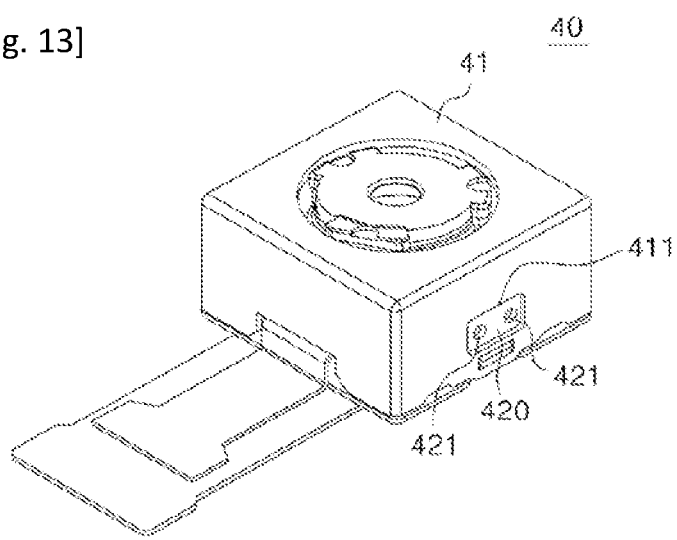

[Fig. 14]
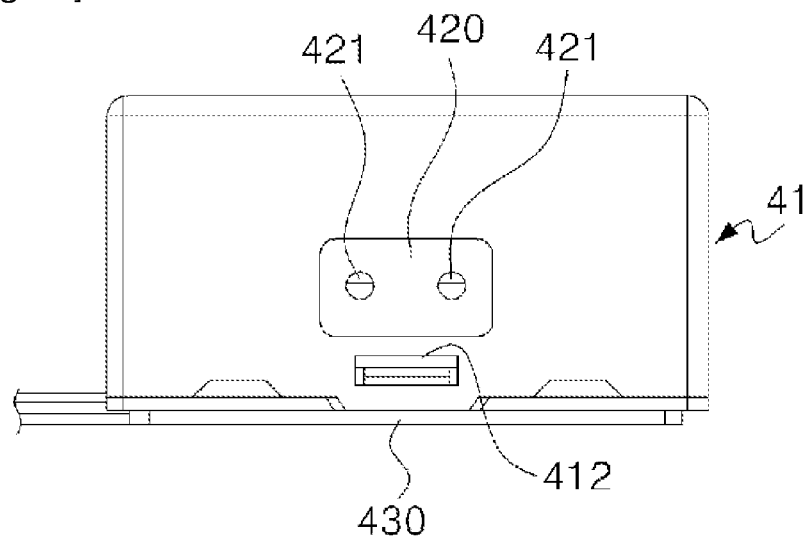
[Fig. 15]
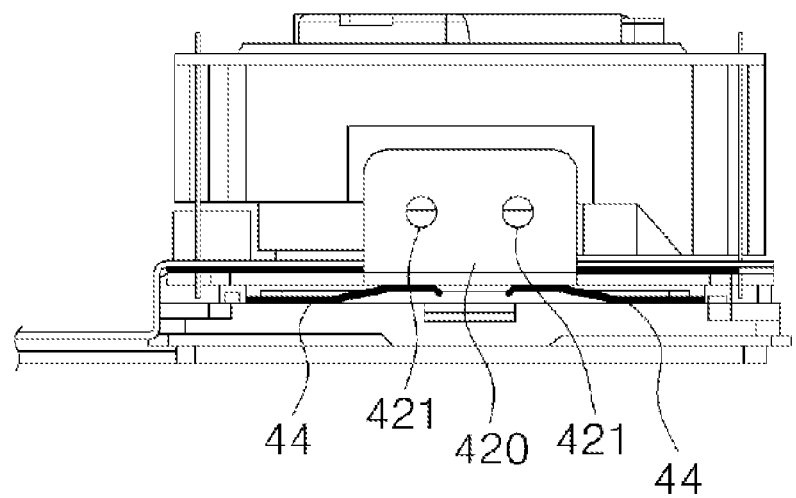

CAMERA LENS MODULE HAVING AUTO-FOCUSING AND OPTICAL IMAGE STABILIZING FUNCTIONS

TECHNICAL FIELD

The present invention relates to a portable terminal, and more particularly to a camera lens module which is employed into a portable terminal.

BACKGROUND ART

Recently, with the development of mobile communication technologies, a popularized portable terminal such as a smartphone has employed at least one camera lens module which is miniaturized and light therein.

Particularly, with respect to a camera lens module employed to the portable terminal, users have required a high capacitance and performance camera lens module. Accordingly, a camera lens module has been developed which corresponds to a class of Digital Single Lens Reflex camera. Furthermore, it has become a trend that the camera lens module is developed toward an advantageous direction for miniaturization and lightening with the maintenance of a high performance and a high capacity.

The camera lens module employed to the portable terminal has an Auto-Focusing (AF) function, a zoom-in and zoom-out function, and so on, and also has a stabilizer for compensating for a hand shaking, which makes a camera perform its functions. The camera lens module generally includes a lens system, a lens driving unit for enabling the lens system to move along an optical axis direction and making the lens system perform focusing, and an image sensor for picking up light incident through the lens system and converting the light into image signals.

Examples of the conventional camera lens module mounted on the portable terminal are disclosed in Korean Patent Application Nos. 2010-106811 and 2009-83613.

However, since there is a trend that the portable terminal is gradually miniaturized with the maintenance of the high quality, a camera lens module mounted on the portable terminal also is required to be miniaturized with the maintenance of the high performance and to have improved assemblability in consideration of the cost of products.

DISCLOSURE OF INVENTION

Technical Problem

The present invention has been made to solve the above mentioned problems in the prior art, and an aspect of the present invention is to provide a camera lens module of a portable terminal, which is capable of minimizing an interference of a magnetic field between driving units.

Another aspect of the present invention is to provide a camera lens module of a portable terminal, in which assemblability is improved.

Still another aspect of the present invention is to provide a camera lens module of a portable terminal, which is advantageous for miniaturization.

Further still another aspect of the present invention is to provide a camera lens module of a portable terminal having enhanced active align.

Solution to Problem

A camera lens module of a portable terminal includes an external case; an OIS carrier disposed in the external case; a lens system which is guided along an optical axis in the OIS carrier; an AF driving unit facing to a first surface of the external case and which enables the lens system to move; a first OIS driving unit disposed in parallel along a second surface of the external case at the other side opposite to the first surface on which the AF driving unit is disposed; and a second OIS driving unit disposed in parallel along a third surface of the external case between the first OIS driving unit and the AF driving unit.

Further, a camera lens module of a portable terminal includes an external case; an OIS carrier disposed in the external case; a lens system which is guided along an optical axis in the OIS carrier; an AF driving unit disposed in parallel along a first surface of the external case and which enables the lens system to move; and one or more OIS driving units and OIS position detecting units which are disposed along second, third and fourth surfaces except for the first surface, wherein the OIS driving units include a first OIS driving unit disposed along the second surface opposite to the first surface, and a second OIS driving unit disposed along the third surface between the first and second surfaces, and the OIS position detecting units include a first OIS position detecting unit disposed together with the first OIS driving unit along the second surface; and a second OIS position detecting unit disposed along a fourth surface opposite to the third surface.

Further, a camera lens module of a portable terminal includes an external case; an OIS carrier disposed in the external case; a lens system which is guided along an optical axis in the OIS carrier; an AF driving unit disposed in parallel along a first surface of the external case and which enables the lens system to move; and one or more OIS driving units and OIS position detecting units which are disposed on second, third and fourth surfaces except for the first surface, wherein the OIS driving units include a first OIS driving unit disposed along a second surface opposite to the first surface; and a second OIS driving unit disposed along a third surface between the first and second surfaces, and the OIS position detecting units include the first OIS position detecting unit disposed together with the first OIS driving unit along the second surface; and the second OIS position detecting unit disposed together with the second OIS driving unit along the third surface.

Further, a camera lens module of a portable terminal includes an external case; an actuator, disposed in the external case, for compensating hand shaking of lens or moving the lens along an optical axis; a sensor, coupled with the external case, for confronting with the actuator; and a device, disposed to be exposed into the outside of the external case and coupled with an external alignment apparatus after assembling the camera lens module, for getting an aligning position of the actuator.

Advantageous Effects of Invention

As described above, according to the present invention, a plurality of OIS driving units and OIS position detecting units are disposed at appropriate positions. It contributes to a miniaturization of the device for driving the camera lens module of the portable terminal and a miniaturization of the camera lens module. Particularly, the OIS driving unit and the OIS position detecting unit are mounted to lie down, thereby improving the assemblability.

Further, according to the embodiment of the present invention, a focal distance between the lens and image sensor and a tilting state are actively aligned using an external 6 axis alignment apparatus after assembling the camera lens module, and a aligning state is fixed, thereby to enhance the resolution of the image sensor due to enhanced alignment.

BRIEF DESCRIPTION OF DRAWINGS

The above and other aspects, features, and advantages of the present disclosure will be more apparent from the following detailed description taken in conjunction with the accompanying drawings, in which:

FIG. 1 is a plane view schematically illustrating a camera lens module employing a driving device according to a first embodiment of the present invention;

FIGS. 2A and 2B are exploded perspective views illustrating a structure of the camera lens module employing the driving device according to the first embodiment of the present invention, in which elements of the camera lens module are sequentially arranged along an optical axis;

FIGS. 3 and 4 are perspective views illustrating the camera lens module employing the driving device according to the first embodiment of the present invention;

FIG. 5 is a perspective view illustrating the camera lens module employing the driving device according to the first embodiment of the present invention, in which the camera lens module is cut in a longitudinal direction;

FIG. 6 is a perspective view illustrating the camera lens module employing the driving device according to the first embodiment of the present invention, in which the camera lens module is cut in a crosswise direction;

FIG. 7 is a plane view schematically illustrating a camera lens module employing a driving device according to a second embodiment of the present invention;

FIGS. 8 and 9 are perspective views illustrating the camera lens module employing the driving device according to the second embodiment of the present invention;

FIG. 10 is a plane view schematically illustrating a camera lens module employing a driving device according to a third embodiment of the present invention; and FIG. 11 is a perspective view illustrating the camera lens module employing the driving device according to the third embodiment of the present invention.

FIG. 12 is an exploded perspective view illustrating the configuration of the camera lens module according to the embodiment of the present invention.

FIG. 13 is a perspective view illustrating the camera lens module according to the embodiment of the present invention.

FIG. 14 is a one side view for FIG. 13.

FIG. 15, which is a perspective view illustrating the camera lens module according to the embodiment of the present invention, illustrates a state that removes an external case.

MODE FOR THE INVENTION

The following description with reference to the accompanying drawings is provided to help a whole understanding of embodiments of the present invention as defined by the claims and the equivalents of the claims. Although the description includes various specific details to help the understanding of the embodiment of the present invention, the details will be merely regarded as examples. Therefore, it will be understood by a person skilled in the art that variations and modifications of the embodiments described in the disclosure can be achieved without departing from the scope and spirit of the present invention. Further, the description of well-known functions and structures will be omitted for definition and simplicity.

Hereinafter, a structure of a device for driving a camera lens module 10 according to a first embodiment of the present invention will be described with reference to FIGS. 1 to 6.

The portable terminal on which the camera lens module according to the present invention is mounted is merely a general term, and the present invention may be applied to any one of a mobile phone, a palm sized Personal Computer (PC), a Personal Communication System (PCS), a Personal Digital Assistant (PDA), a Hand-held PC (HPC), a smart phone, a wireless Local Area Network (LAN) terminal, a laptop computer, a netbook, a tablet PC and the like. Therefore, a term "portable terminal" should not be used to limit that the present invention is applied to a specific type device.

In FIGS. 1 to 6, a three-dimensional coordinate of X, Y and Z is shown in which an axis of Z is a longitudinal direction of the camera lens module and means an optical axis along which a lens barrel 102 moves, an axis of X means a horizontal direction (a direction which is at right angles with the optical axis) of the camera lens module, and an axis of Y means a vertical direction (a direction which is at right angles with the optical axis and the axis of X) of the camera lens module. An Automatic Focus (AF) driving unit 11 provides a force to enable a lens carrier 103 to move along the optical axis, and Optical Image Stabilizer (OIS) driving units 12 and 13 provide forces in directions of X and Y axes to compensate a horizontal balance (a hand shaking) around the optical axis of an OIS carrier 104 (see FIG. 2B).

The device 10 for driving the camera lens module (hereinafter, referred to as a "module") according to the present invention will be described in detail with reference to FIGS. 1 to 6. It is noted that the module described below pursues miniaturization and improved assemblability, and especially minimization of an interference of a magnetic field.

The driving unit 10 according to the first embodiment of the present invention includes an external case 100 and 101 which has a polyhedral shape, a lens system 102 and 103 which is guided along an optical axis in the external case 100 and 101, an AF driving unit 11 which is disposed in parallel with a first surface 100a of the external case 100 and 101 to enable the lens system 102 and 103 to move, an OIS carrier 104 in which the lens system is disposed, and one or more OIS driving units 12 and 13 which are disposed on second and third surfaces 100b and 100c respectively and compensate a balance of the lens system 102 and 103. The driving unit 10 further includes OIS position detecting units 14 and 15 which are disposed on a fourth surface 100d.

The external case 100 and 101 has a polyhedral shape, particularly a roughly rectangular parallelepiped shape, in which upper and lower surfaces have a regular tetragon shape and four lateral surfaces 100a, 100b, 100c and 100d have an approximately rectangular shape. As described above, the external case 100 and 101 has the four lateral surfaces 100a, 100b, 100c and 100d. Hereinafter, the four lateral surfaces are referred to as first, second, third and fourth surfaces 100a, 100b, 100c and 100d, respectively.

In the external case, a surface opposite to the first surface 100a is referred to as the second surface 100b, another surface between the first and second surfaces 100a and 100b is referred to as the third surface 100c, and still another surface opposite to the third surface 100c is referred to as the fourth surface 100d. The first, second, third and fourth surfaces 100a, 100b, 100c and 100d are perpendicular to one another.

As shown in FIGS. 3 and 4, the OIS carrier 104 has first, second and third openings 1041, 1042 and 1043 formed on second, third and fourth surfaces 104b, 104c and 104d which face to the second, third and fourth surfaces 100b, 100c and 100d of the external case, respectively, in which first and second OIS driving units 12 and 13 and first and second OIS position detecting units 14 and 15, described later, are disposed. The first, second and third openings 1041, 1042 and 1043 are formed at lower portions (bottoms) of the second, third and fourth surfaces 104b, 104c and 104d, respectively. In addition, the first, second and third openings 1041, 1042 and 1043 have an oblong shape which is elongated in one direction, and in which the first and second OIS driving units 12 and 13, and the first and second OIS position detecting units 14 and 15 are disposed respectively.

Further, the OIS carrier has an opening 1040 formed on a first surface thereof. The opening 1040 is formed in order that an AF magnet mounted on a lens barrel which is described later directly faces to an AF coil and an AF position detecting unit in an AF driving unit, and in which the AF coil and the AF position detecting unit are disposed.

Referring to FIGS. 2A and 2B again, the external case 100 and 101 is made of a non-magnetic material, and functions as a housing which receives other parts and protects the received parts from an exterior. Two circuit boards 106 and 109 extend from the external case 100 and 101 and are in electrical contact with an external electric power source (not shown). One circuit board 106 extends from an OIS circuit board, and the other circuit board 109 is an image sensor circuit board 108. The external case is constituted of a combination an upper case 100 and a sensor base 101.

According to the embodiment of the present invention, there is no necessity to limit the external case 100 and 101 to the rectangular parallelepiped shape. The external case 100 and 101 may be configured to have a regular hexahedral shape according to a mounting arrangement of internal parts and also may have a polyhedral shape with a pentagonal or hexagonal cross-section. A reference numeral 109 denotes an end portion of the image sensor board.

The lens system includes the lens barrel 102 having a lens (not shown) and the lens carrier 103 which receives the lens barrel 102 therein and moves together with the lens barrel 102 along the optical axis. The lens barrel 102 has a cylinder shape, and is moved along the optical axis by means of the AF driving unit 11 in a state of being fully received in the lens carrier 103, so as to focus the lens. The lens carrier 103 fully receives the lens barrel 102 therein, and has a magnet mounting groove (not shown) of a rectangular shape on an outer peripheral surface thereof. The lens carrier 103 is guided by means of a pair of guide devices along the optical axis. The pair of guide devices includes well-known guide units g1 and g2, and ball bearings b1 and b2 which are received in the guide units g1 and g2 to carry out a rolling operation. The lens barrel 102 may be detachably coupled to the lens carrier 103, or constituted of a one-piece structure.

In the present invention, a single AF driving unit is described as an example of the AF driving unit. Further, with respect to the OIS driving units 12 and 13, it is described as an example that two OIS driving units are disposed on the second and third surfaces of the external case around the optical axis, respectively, except for the first surface of the external case on which the AF driving unit 11. However, it is possible to dispose two or more OIS driving units.

Hereinafter, a structure of the first and second OIS driving units 12 and 13 will be described in detail. The OIS carrier 104 is supported by an OIS base 107 which is positioned at a bottom thereof. The first and second OIS driving units 12 and 13 are disposed between an OIS base and the second and third surfaces 104b and 104c of the OIS carrier 104 which faces to the second and third surfaces of the external case respectively, so as to compensate for a hand shaking of the OIS carrier 104. The OIS driving unit includes a first OIS driving unit 12 disposed along the second surface 104b opposite to the first surface of the first surface 104a of the OIS carrier, and a second OIS driving unit 13 disposed along the third surface 104c present between the first and second surfaces 104a and 104b of the OIS carrier. Further, the OIS position detecting unit includes first and second OIS position detecting units 14 and 15 arranged in parallel along the fourth surface 104d opposite to the third surface 104c of the OIS carrier. The AF driving unit 11 and the first OIS driving unit 12 are disposed to face to each other, and the second OIS driving unit 13 and the first and second OIS position detecting units 14 and 15 are disposed to face to each other.

The first OIS driving unit 12 has an oblong shape extending in a direction, and is disposed in parallel along the second surface 104b. The second OIS driving unit 13 also has an oblong shape extending in a direction, and is disposed in parallel along the third surface 104c. The first and second OIS position detecting units 14 and 15 are arranged to face to each other. The first and second OIS position detecting units are disposed in parallel along the fourth surface.

The AF driving unit 11 is mounted to be upright between the lens carrier 103 and the OIS carrier 104, and the first and second OIS driving units 12 and 13 are mounted between the OIS base 107 and the second and third surfaces 104b and 104c of the OIS carrier 104 while lying down at a lower portion of the OIS carrier 104. The first and second OIS position detecting units 14 and 15 are mounted between the OIS base 107 and the fourth surface 104d of the OIS carrier while lying down at the lower portion of the OIS carrier 104.

The first OIS driving unit 12 includes a first OIS magnet m2 disposed in parallel along the second surface 104b of the OIS carrier while lying down, and a first OIS coil c2 disposed on the OIS base 107 and facing to the first OIS magnet m2. Further, the second OIS driving unit 13 includes a second OIS magnet m3 disposed in parallel along the second surface 104c of the OIS carrier while lying down, and a second OIS coil c2 disposed on the OIS base 107 and facing to the second OIS magnet m3.

A phrase "while lying down" means that the first and second magnets m2 and m3 with an oblong shape are disposed so that upper and lower surfaces (surfaces with the largest area) are in parallel with an X and Y plane. In addition, it is meant by that the first and second OIS coils c2 and c3 with an approximately oblong plate shape have the upper and lower surfaces arranged in parallel with the X and Y plane. In addition, it is meant that the first and second position detecting units 14 and 15 with an approximately oblong plate shape have the upper and lower surfaces arranged in parallel with the X and Y plane. If the magnets or coils are mounted while lying down rather than being upright, the assemblability of the module can be improved.

The first OIS position detecting unit 14 includes a first OIS position detecting magnet m4-1 disposed in parallel along the fourth surface 104 d of the OIS carrier, and a first OIS position detecting sensor h2 disposed on the OIS base 107 and facing to the first OIS position detecting magnet m4-1. The second OIS position detecting unit 15 includes a second OIS position detecting magnet m4-2 disposed in parallel along the fourth surface 104 d of the OIS carrier, and a second OIS position detecting sensor h3 disposed on the OIS base 107 to face to the second OIS position detecting magnet m4-2. The first and second OIS position detecting sensors h2 and h3 include Hall sensors respectively. Since the first OIS position detecting magnet m4-1 and the second OIS position detecting magnet m4-2 are arranged so that magnetized directions are perpendicular to each other, it is possible to detect a movement of the OIS carrier in the direction of axes of X and Y.

The AF driving unit 11 is a driving unit which is interposed between one surface 100a of the external case and one side of the lens carrier 103 which face to each other, and enables the lens carrier 103 move along an optical axis. The AF driving unit includes an AF magnet m1 which is mounted on the outer peripheral surface of the lens carrier 103 in parallel with the one surface of the case, an AF coil c1 which is disposed on the one surface of the external case to face to the AF magnet m1, an AF positioning sensor which is disposed in an opening of the AF coil c1, an AF driving IC which is disposed beside the AF coil c1, and an AF yoke y which is disposed to face to and support the AF coil c1. When electric current is applied to the AF coil c1, an electromagnetic force generated between the AF coil c1 and the AF magnet m1 makes the lens barrel 103 move along the optical axis so that a focal distance of the lens (not shown) can be automatically adjusted. The AF positioning sensor includes a Hall sensor, and may be integrated with the driving IC.

That is, the AF driving unit 11 according to the present invention makes the lens carrier 103 move along the optical axis independently from the OIS carrier 104 because the AF coil c1 or the AF magnet m1 is exposed through the opening on the one surface OIS carrier 104 to face to the one surface of the external case 100 and 101 while the AF coil c1 or the AF magnet m1 is mounted on the one surface of the external case 100 and 101 to face to the AF coil c1 or the AF magnet m1. Therefore, the module according to the present invention is capable of performing an AF driving and an OIS driving with a minimum size and a minimum driving force.

The AF driving unit 11 further includes an AF circuit board 105 disposed at an upper end of the OIS carrier 104, and the first and second OIS driving units 12 and 13 include an OIS circuit board 106 disposed on the OIS base 16. The AF circuit board 105 and the OIS circuit board 106 are flexible circuit boards. The AF circuit board 105 and the OIS circuit board 106 are disposed in parallel at an upper end and a lower end of the OIS carrier 104 in a direction perpendicular to the optical axis, and are opposed to each other. The AF circuit board 105 and the OIS circuit board 106 generally have a regular tetragonal shape, and four corners, respectively. The AF circuit board 105 and the OIS circuit board 106 have suspension wires as described later, which are fixed to the four corners, respectively.

The AF circuit board 105 and the OIS circuit board 106 are electrically connected by means of at least one suspension wire w. That is, the suspension wire w performs a function of electrically connecting the AF flexible circuit board 105 with the OIS flexible circuit board 106, and supports the AF flexible circuit board 105 and the OIS flexible circuit board 106. Of course, the suspension wire w is a conductor with elasticity and is a linear type. Four suspension wires w are used, and are disposed to be upright at the four corner regions of the OIS carrier, respectively. Each suspension wire w extends along the optical axis and has one end thereof fixed to the AF flexible circuit board 105 and the other end thereof fixed to the OIS flexible circuit board 106. To do this, the AF flexible circuit board 105 has soldering openings formed at the four corners thereof respectively, and the OIS flexible circuit board 106 has soldering openings formed at the four corners thereof respectively. Further, the OIS carrier 104 has structures at the four corner regions on the upper end thereof, through each of which the suspension wire w extends.

Preferably, the OIS circuit board 106 is disposed between the OIS carrier 104 and the OIS base 107.

In FIG. 2B, a reference character 'f' denotes an 'IR filter', and a reference character 's' refers to an 'image sensor'.

On the other hand, the first OIS magnet m2 and the first OIS coil c2 which constitute the first OIS driving unit may be changed in their arrangement positions, and the second OIS magnet m3 and the second OIS coil c3 which constitute the second OIS driving unit may be changed in their arrangement positions. In other words, the first and second OIS magnets m2 and m3 are disposed on the OIS base 111, and the first and second OIS coils c2 and c3 are positioned in the first and second openings 1041 and 1042 of the OIS carrier, respectively.

In the present invention, moreover, the four suspension wires are employed in order to connect the AF flexible circuit board 105 with the OIS flexible circuit board 106. However, it is possible to electrically connect the AF flexible circuit board with the OIS flexible circuit board by using a separate flexible circuit board instead of the suspension wires.

Further, the AF magnet and the AF coil which constitute the AF driving unit of the module may be replaced with a piezoelectric element.

Hereinafter, a device 20 for driving a camera lens module according to a second embodiment of the present invention will be described. FIG. 7 is a plane view schematically illustrating the camera lens module employing the driving device according to the second embodiment of the present invention. FIGS. 8 and 9 are perspective views illustrating the camera lens module employing the driving device according to the second embodiment of the present invention. Referring to FIGS. 7 to 9, with the description of the driving device 20 according to the second embodiment of the present invention, the driving device 20 has the same structure as that of the driving device 10 except for the first and second OIS driving units 22 and 23, and the first and second OIS position detecting units 24 and 25, in comparison to the driving device 10. Accordingly, only the structure of the first and second OIS driving units 22 and 23 and the first and second position detecting units 24 and 25 will be described in order to avoid duplicating the description of other elements.

The driving unit according to the second embodiment of the present invention includes an external case 200 which has a polyhedral shape, a lens system 202 and 203 which is guided along an optical axis in the external case 200, an AF driving unit 21 which is disposed in parallel with a first surface 200a of the external case 200 to enable the lens system 202 and 203 to move, an OIS carrier 204 which receives the lens system 202 and 203, and one or more OIS driving units 22 and 23 and OIS position detecting units 24 and 25 which are disposed on second, third and fourth surfaces respectively, except for the first surface 200a and compensate a balance of the lens system with a resultant force thereof. Further, the OIS driving unit includes the first OIS driving unit 22 disposed along the second surface 200b opposite to the first surface 200a, and the second OIS driving unit 23 disposed along the third surface 200c interposed between the first and second surfaces 200a and 200b. Further, the OIS position detecting unit includes the first OIS position detecting unit 24 disposed along with the first OIS driving unit 22 on the second surface 200b, and the second OIS position detecting unit 25 disposed along the fourth surface 200*d* opposite to the third surface 200*c*.

The AF driving unit 21 faces to the first OIS driving unit 22 and the OIS position detecting unit 24, and the second OIS driving unit 23 faces to the second OIS position detecting unit 25. Preferably, the OIS position detecting unit 24 is disposed to be spaced apart from the second OIS position detecting unit 25, and more preferably disposed at a left side of the first OIS driving unit 22 (see FIG. 7).

As shown in FIGS. 8 and 9, the OIS carrier 204 is supported by the OIS base 207 positioned on a bottom of the OIS carrier 204.

The AF driving unit 21 is mounted to be upright along the first surface 200*a*, and the first OIS driving unit 22 and the first OIS position detecting unit 24 are mounted to lie down on a lower portion of the OIS carrier 204 along the second surface 200*b*. The second OIS driving unit 23 is mounted to lie down at the lower portion of the OIS carrier 204 along the third surface 200*c*, and the second OIS position detecting unit 25 is mounted to lie down at the lower portion of the OIS carrier 204 along the fourth surface 200*d*.

Particularly, the first OIS driving unit 22 includes a first OIS magnet 220 disposed in parallel along the second surface 204*b* of the OIS carrier opposite to the second surface 200*b*, and a first OIS coil 222 disposed on the OIS base 207 and facing to the first OIS magnet 220. The second OIS driving unit 23 includes a second OIS magnet 230 disposed in parallel along the third surface 204*b* of the OIS carrier opposite to the third surface 200*c*, and a second OIS coil 232 disposed on the OIS base 207 and facing to the second OIS magnet 230.

The first OIS position detecting unit 24 includes a first OIS position detecting sensor 240 disposed on the OIS base 207 and facing to and partially sharing the first OIS magnet 220. The second OIS position detecting unit 25 includes a second OIS position detecting magnet 250 disposed in parallel along the fourth surface 204*d* of the OIS carrier, and a second OIS position detecting sensor 252 disposed on the OIS base 207 to face to the second OIS position detecting magnet 250.

Preferably, the first and second OIS position detecting magnets 220 and 230 have different lengths, and the first OIS position detecting magnet 220 has a longer length than that of the second OIS position detecting magnet 230. This is because of sharing a part of the first OIS magnet 220.

Preferably, the first OIS driving unit 22 and the first OIS position detecting unit 24 are not disposed at a center portion of the second surface 204*b*, but the second OIS driving unit 23 and the second OIS position detecting unit 25 are disposed at center portions of the third and fourth surfaces 204*c* and 204*d*, respectively.

At this time, the OIS carrier 204 has first, second and third openings 2041, 2042 and 2043 formed at lower portions of the second, third and fourth surfaces 204*b*, 204*c* and 204*d*, respectively, in which the first OIS driving unit 22 and the first OIS position detecting unit 24 are mounted and the second OIS driving unit 23 and the second OIS position detecting unit 25 are mounted. The respective first, second and third openings 2041, 2042 and 2043 have an oblong shape extending in a direction.

On the other hand, in the driving device 20, the OIS coil and the OIS magnet may be changed with each other in an arrangement position.

Hereinafter, a device 30 for driving a camera lens module according to a third embodiment of the present invention will be described. FIG. 10 is a plane view schematically illustrating a camera lens module employing a driving device 30 according to the third embodiment of the present invention.

FIG. 11 is a plane view schematically illustrating the camera lens module employing the driving device 30 according to the third embodiment of the present invention. Referring to FIGS. 10 to 11, with the description of the driving device 30 according to the third embodiment of the present invention, the driving device 30 has the same structure as that of the driving device 10 except for first and second OIS driving units 32 and 33, and first and second OIS position detecting units 34 and 35, in comparison with the driving device 10 shown in FIG. 1. Accordingly, only the structure of the first and second OIS driving units 32 and 33 and the first and second OIS position detecting units 34 and 35 will be described in order to avoid duplicating the description of other elements.

The device 30 for driving the camera lens module according to the third embodiment of the present invention includes an external case 300 which has a polyhedral shape, a lens system 302 and 303 which is guided along an optical axis in the external case 300, an AF driving unit 31 which is disposed in parallel with a first surface 300*a* of the external case to enable the lens system 302 and 303 to move, an OIS carrier 304 which receives the lens system 302 and 303, and one or more OIS driving units 32 and 33 and OIS position detecting units 34 and 35 which are disposed on second, third and fourth surfaces respectively, except for the first surface 300*a* and compensate a balance of the lens system 302 and 303 with a resultant force thereof.

The OIS driving unit includes the first OIS driving unit 32 disposed along the second surface 300*b* opposite to the first surface 300*a*, and the second OIS driving unit 33 disposed along the third surface 300*c* interposed between the first and second surfaces 300*a* and 300*b*. The OIS position detecting unit includes the first OIS position detecting unit 34 disposed together with the first OIS driving unit 31 along the second surface 300*b*, and a second OIS position detecting unit 35 disposed together with the second OIS driving unit 32 along the third surface 300*c*.

The AF driving unit 31 is mounted to be upright along the first surface 300*a* in the external case, and the first OIS driving unit 32 and the first OIS position detecting unit 34 are mounted to lie down at a lower portion of the second surface 304*b* along a second surface 304*b* of the OIS carrier opposite to the second surface 300*b*. The second OIS driving unit 33 and the second OIS position detecting unit 35 are mounted to lie down at a lower portion of the third surface 304*c* along a third surface 304*c* of the OIS carrier opposite to the third surface 300*c*.

Particularly, the first OIS driving unit 32 includes a first OIS magnet 320 disposed in parallel along the second surface 304*b* of the OIS carrier while lying down, and a first OIS coil 322 disposed on the OIS base 307 and facing to the first OIS magnet 320. The second OIS driving unit 33 includes a second OIS magnet 330 disposed in parallel along the third surface 304*c* of the OIS carrier while lying down, and a second OIS coil 332 disposed on the OIS base 307 and facing to the second OIS magnet 330.

The first OIS position detecting unit 34 includes a first OIS position detecting sensor 342 disposed on the OIS base 307 and facing to and partially sharing the first OIS magnet 320. The second OIS position detecting unit 35 includes a second OIS position detecting sensor 352 disposed on the OIS base 307 and facing to and partially sharing the first OIS magnet 330.

Preferably, the first and second OIS magnets 320 and 330 have the same length, and a part of each of the first and second OIS magnets 320 and 330 is used as a magnet of the first and second OIS position detecting units 34 and 35.

The first OIS driving unit 32 and the first OIS position detecting unit 34 are not disposed at a center portion of the second surface 304b, and also the second OIS driving unit 33 and the second OIS position detecting unit 35 are not disposed at a center portion of the third surface 304c. This is because of sharing a part of the first and second OIS magnets.

The OIS carrier 304 has the first, second and third surfaces, in which the first surface (not shown) means a surface facing to the first surface 300a of the external case, the second surface 304b means a surface facing to the second surface 300b of the external case, and the third surface 304c means a surface facing to the third surface 300c of the external case.

The OIS carrier 304 has first and second openings 3041 and 3042 formed at lower portions (bottoms) of the second and third surfaces 304b and 304c respectively, in which the first OIS driving unit 32 and the first OIS position detecting unit 34, and the second OIS driving unit 33 and the second OIS position detecting unit 35 are mounted respectively. The first and second openings 3041 and 3042 have an oblong shape extending in a direction.

As above, the configuration of the camera lens module employing a driving device according to various embodiments was described. Hereinafter, the embodiment of the present invention for enhancing active align of the camera lens on assembling the camera lens module will be described.

The active align mentioned above means the alignment for a focal distance between the lens and image sensor and a tilting state on 6 axes in a small camera lens module employed into the portable terminal. Particularly, it means 6 axes alignment for the actuator after assembling the camera lens module.

The embodiment for enhancing the alignment on assembling the camera lens module 40 according to the present invention will be described with reference to FIG. 12 to FIG. 15. The difference between the camera lens modules shown in FIG. 1 and FIG. 12 to FIG. 15 is only described on comparing with the camera lens module shown in FIG. 1 and the description for the same configuration is omitted for avoiding the duplicated description.

The alignment adjusts a focal distance between the lens and image sensor and a tilting. The alignment aligns the camera lens module 40 using an adjusting apparatus having 6 axes (not shown) outside. To this end, the present invention implements an aligning state between the lens and image sensor by getting an aligning position of an actuator 42 to be assembled.

The camera lens module 40 of the present invention includes an external case 41, an actuator 42, and a sensor 43. The external case 41, the actuator 42, and the sensor 43 are coupled along the optical axis. The external case 41 and sensor 43 provides an appearance of the camera lens module 40. An internal space formed by the external case 41 and sensor 43 is disposed with the actuator 42. Further, a bottom surface of the actuator 42 is confronted with the sensor 43, and, in more detail, the lens (not shown) disposed in the actuator 42 is confronted with an image sensor S. The lens not shown moves along the optical axis by power provided from the actuator 42 and therefore the focal distance of the lens is adjusted.

The actuator 42 is coupled along the optical axis in the external case 41, provides the power moving the lens along the optical axis, or provides the power adjusting the tilting state of the lens. The power adjusting the focus of the lens along the optical axis is provided by the AF driving unit, and the power adjusting the tilting of the lens along the optical axis is provided by the OIS driving unit. The actuator 42 includes an OIS carrier, a lens system, an AF driving unit, and an OIS driving unit, the detailed description is omitted because configurations such as the OIS carrier, the lens system, the AF driving unit and the OIS driving unit are the same as them of the embodiment described already. However, the OIS carrier includes a holding section 420 to be described later and therefore the holding section 420 only is described.

The sensor 43 includes a sensor base 430, and an image sensor S disposed on the sensor base 430. A peripheral unit 431 of the sensor 43 is formed along the circumference of the image sensor S. The image sensor S is connected to external electrical power by a flexible circuit board 432. The sensor base 430 has four corners, and at least one elastic body to be described later is disposed at two corners.

The alignment of the camera lens module 40 according to the present invention is applied at assembling processes. That is, the alignment of the camera lens module 40 is applied to check and adjust the aligning state of the actuator 42 prior to a final product after assembling the external case 41, the actuator 42 and sensor 43.

After assembling the camera lens module 40, a apparatus for 6 axis (±X, ±Y, ±Z) alignment of the assembled actuator 42 includes a aperture 411 disposed in the external case, and a holding section 420, disposed in the aperture 411, to be exposed into the outside. The apparatus (6 axis adjusting apparatus including a picker) for 6 axis alignment not shown is coupled with the holding section 420, fixes the aligned state after aligning the actuator 42, and completes the alignment of the camera lens module 40.

The aperture 411 is formed at one side surface of the external case 41, and 4 side surfaces, except a top surface 410a, of 5 external surfaces outside the external case 41 are called first, second, third and fourth side surfaces 401b-410e. Preferably, the first side surface 410b, not disposed with the AF driving unit and OIS driving unit in the actuator 42, of first, second, third and fourth side surfaces 401b-410e is formed with the aperture 411. The aperture 411 may be configured in a polygonal shape. FIG. 12 shows a rectangular aperture. The aperture 411 is formed to expose the holding section 420 into the outside.

A coupling aperture 412 is further included below the aperture 411. The coupling aperture 412 is coupled with a projection disposed in the sensor 43, and therefore the external case 41 is coupled with the sensor 43.

The holding section 420 is disposed integrally with the OIS carrier. The OIS carrier has a plate shape of metal material and the holding section 420 is extensively protruded from the OIS carrier, is formed to be bended in a vertical direction, and is configured in a vertical wall shape. On the other hand, when the OIS carrier is an injection product, not the metal material, the holding section 420 may be injected integrally with the OIS carrier. The holding section 420 is disposed in a vertical direction (optical axis direction) from the OIS carrier and is automatically accommodated or inserted into the aperture 411 when the external case 41, the actuator 42, and sensor 43 are coupled in the optical axis direction. Such a state is shown in FIG. 13.

The holding section 420 includes at least one coupling hole 421 to couple with the external 6 axes alignment apparatus not shown. The coupling holes 421 are configured by a pair of one As already described, the circumference 431 of the top surface of the sensor 43 is disposed with a plurality of elastic bodies 44. The elastic bodies 44 are disposed between the actuator 42 and sensor 43, and in more detail, are disposed between the bottom surface of the OIS carrier and the top surface of the sensor 43. In particular, the elastic bodies 44 are disposed at the corner of circumference of the top surface of the sensor, and disposed at both sides at which the aperture 411 and the holding section 420 are present, respectively.

Each of the elastic bodies 44 are mounted to be confronted at both corners, and are symmetrically disposed. Thus, the elastic bodies 44 are confronted from each other as a pair of two, and are symmetrically disposed.

Particularly, each of a pair of one at both sides on the holding section 420 basis is disposed at both corners, respectively. Each of the elastic bodies 44, which are leaf springs including a fixing end and a free end, are tightly disposed at the bottom surface of the OIS carrier, wherein the fixing ends are fixed at the corner of circumference of the top surface of the sensor 43 by a coupling structure (coupling between the projection and hole) and the free ends are extended from the fixing end. An elastic force is provided to each of the elastic bodies 44 in the direction away from the top surface of the sensor 43. The elastic bodies 44 are tightly supported at the bottom surface of the OIS carrier and therefore support the actuator 42.

Each of the fixing ends are fixed at the corner of a substrate 430 of the sensor, and each of the free ends are tightened at the bottom surface of the holding section 420.

The alignment of the actuator 42 may be minutely adjusted by the elastic bodies 44 on assembling the camera lens module 40. After the camera lens module 40 is assembled and it checks that the actuator 42 is accurately aligned, the alignment of the actuator 42 should be adjusted. When a place disposing the elastic bodies 44 is applied as viscosity material, the movement amounts of the elastic bodies 44 are reduced due to the viscosity and therefore the alignment apparatus not shown is minutely aligned. It is preferable that such a viscosity material is cured after some time has lapsed. For example, UV curable material may be used as the viscosity material. The alignment state of the actuator 42 is cured and fixed by the viscosity material.

Therefore, the present invention enhances the active align of the camera lens module by aligning the actuator after assembling the camera lens module.

Although the present invention is shown and described with reference to the specific embodiments, it will be understood by a person skilled in the art that the details and forms of the present invention may be modified in various forms without departing from the spirit and the scope of the present invention as defined by the attached claims and the equivalents thereof.

The invention claimed is:

1. A camera lens module for a portable terminal, comprising:
   an external case;
   an Optical Image Stabilizer (OIS) carrier disposed within the external case;
   a lens system disposed within the OIS carrier and moving along an optical axis;
   an Automatic Focus (AF) driving unit disposed to face a first surface of the external case and moving the lens system;
   a ball bearing disposed to face the first surface of the external case and guiding a movement of the lens system in the optical axis direction with respect to the OIS carrier; and
   one or more suspension wires connecting and supporting an AF circuit board disposed on a top surface of the OIS carrier and an OIS circuit board disposed on a bottom surface of the OIS carrier.

2. The camera lens module of claim 1, further comprising:
   a first OIS driving unit disposed in parallel on a second surface of the external case opposite the first surface on which the AF driving unit has been disposed; and
   a second OIS driving unit disposed in parallel on a third surface of the external case between the first OIS driving unit and the AF driving unit.

3. The camera lens module of claim 1, wherein the suspension wire electrically connects the AF circuit board and the OIS circuit board.

4. The camera lens module of claim 3, wherein:
   the suspension wires are upright disposed in respective corner areas of the OIS carrier along the optical axis,
   a top of each of the suspension wires is fixed to the AF circuit board, and
   a bottom of each of the suspension wires is fixed to the OIS circuit board.

5. The camera lens module of claim 2, further comprising first and second OIS position detecting sensors disposed in parallel on a fourth surface opposite the third surface of the external case.

6. The camera lens module of claim 5, wherein:
   the first OIS position detecting sensor comprises a first OIS position detecting magnet disposed to lie down on the fourth surface of the OIS carrier facing the fourth surface and a first OIS position detecting sensor disposed in the OIS base and disposed to face the first OIS position detecting magnet along the optical axis, and
   the second OIS position detecting sensor comprises a second OIS position detecting magnet disposed to lie down on the fourth surface of the OIS carrier facing the fourth surface and a second OIS position detecting sensor disposed in the OIS base and disposed to face the second OIS position detecting magnet along the optical axis.

7. The camera lens module of claim 2, further comprising:
   a first OIS position detecting unit disposed along with the first OIS driving unit on the second surface of the external case; and
   a second OIS position detecting unit disposed on a fourth surface opposite the third surface.

8. The camera lens module of claim 7, wherein:
   the first OIS position detecting unit comprises a first OIS position detecting sensor sharing part of a first OIS magnet included in the first OIS driving unit and disposed to face the first OIS magnet along the optical axis, and
   the second OIS position detecting unit comprises a second OIS position detecting magnet disposed to lie down in a parallel direction on the fourth surface of the OIS carrier facing the fourth surface and a second OIS position detecting sensor disposed to face the second OIS position detecting magnet along the optical axis.

9. The camera lens module of claim 2, further comprising:
   a first OIS position detecting unit disposed on the second surface along with the first OIS driving unit; and a second OIS position detecting unit disposed on the third surface along with the second OIS driving unit.

10. The camera lens module of claim 9, wherein:
the first OIS position detecting unit comprises a first OIS position detecting sensor sharing part of a first OIS magnet included in the first OIS driving unit and disposed to face the first OIS magnet along the optical axis, and
the second OIS position detecting unit comprises a second OIS position detecting sensor sharing part of a second OIS magnet included in the second OIS driving unit and disposed to face the second OIS magnet along the optical axis.

11. The camera lens module of claim 1, further comprising an alignment apparatus disposed to be exposed outside the external case and combined with an external alignment apparatus after the camera lens module is assembled, for aligning a position of the lens system.

12. The camera lens module of claim 11, wherein:
the OIS carrier is supported by an OIS base located at a bottom, and
the alignment apparatus comprises an aperture provided on one surface of the external case and a holding section extended and protruded from the OIS base and disposed to be externally exposed through the aperture of the external case.

13. The camera lens module of claim 12, wherein:
the holding section has a vertical wall shape and is vertically bent in the OIS base, and
the holding section comprises at least one coupling hole to be coupled with the external alignment apparatus.

14. The camera lens module of claim 13, wherein:
a plurality of elastic bodies is provided between a bottom surface of the OIS carrier and a top surface of a sensor unit located on a lower side of the OIS base, and
the elastic bodies are disposed at corners on a circumference of the top surface of the sensor unit so that the elastic bodies are symmetrical to each other in pairs.

15. The camera lens module of claim 14, wherein when the lens system is aligned, a viscosity material is coated on the elastic bodies, and the viscosity material is cured after a lapse of a specific time and fixes an alignment state of the lens system.

* * * * *